Oct. 7, 1969     V. BERTHELSEN     3,470,598

METHOD OF MAKING STRUCTURAL ELEMENTS

Filed May 21, 1965     10 Sheets-Sheet 1

Fig. 1.

INVENTOR
Viggo Berthelsen
BY Dicke & Craig
ATTORNEYS

Oct. 7, 1969　　　V. BERTHELSEN　　　3,470,598

METHOD OF MAKING STRUCTURAL ELEMENTS

Filed May 21, 1965　　　　　　　　　　　　　10 Sheets-Sheet 2

INVENTOR
Viggo Berthelsen
Dicke & Craig
BY
ATTORNEYS

Oct. 7, 1969  V. BERTHELSEN  3,470,598
METHOD OF MAKING STRUCTURAL ELEMENTS
Filed May 21, 1965  10 Sheets-Sheet 3

Fig. 4.

INVENTOR
Viggo Berthelsen
BY Dicke & Craig
ATTORNEYS

Fig. 6.

INVENTOR
Viggo Berthelsen
Dicke & Craig
ATTORNEYS

Oct. 7, 1969  V. BERTHELSEN  3,470,598
METHOD OF MAKING STRUCTURAL ELEMENTS
Filed May 21, 1965  10 Sheets-Sheet INVENTOR
Viggo Berthelsen
BY Ducke & Craig
ATTORNEYS

INVENTOR
Viggo Berthelsen
BY Ducke & Craig
ATTORNEYS

Oct. 7, 1969 V. BERTHELSEN 3,470,598
METHOD OF MAKING STRUCTURAL ELEMENTS
Filed May 21, 1965 10 Sheets-Sheet 10

INVENTOR
Viggo Berthelsen
BY Dicke & Craig
ATTORNEYS

United States Patent Office 3,470,598
Patented Oct. 7, 1969

3,470,598
METHOD OF MAKING STRUCTURAL ELEMENTS
Viggo Berthelsen, 14 Lundely, Copenhagen-
Hellerup, Denmark
Filed May 21, 1965, Ser. No. 476,771
Claims priority, application Great Britain, Dec. 21, 1964,
51,854/64
Int. Cl. B23k *31/02;* B23p *15/16*
U.S. Cl. 29—155          6 Claims

ABSTRACT OF THE DISCLOSURE

A structural element formed of a synthetic resin exterior coating extruded over a metallic reinforcement in the form of an elongated perforated strip, a method of extruding the coating, a method of perforating the metallic reinforcement, and apparatus for performing the methods and aiding in the construction of the structural element are disclosed in accordance with the invention.

---

The present invention relates to a method of making structural elements.

It is a purpose of the invention to provide a method of making a structural element useful in the building industry which has an exterior finish that does not require any maintenance.

It is a further purpose of the invention to provide a method of making a structural element in the form of an elongated profile which is suitable for reconstruction of frames.

Still a further purpose of the invention is to provide a method of making a structural element in the form of a composite structure of metal and synthetic resin in which the metal is completely embedded in the synthetic resin.

Still a further purpose of the invention is to provide a profile element having an interior metallic reinforcement in the form of an elongated strip and an exterior coating of synthetic resin which is connected with the metallic reinforcement in such a manner that the coating is able to withstand all such varying temperature conditions to which the structure will be subjected in practice without the danger of cracking.

Still a further purpose of the invention is to provide a method for making a composite structure of an interior metallic reinforcement with a coating of synthetic resin which is resistant against corrosion.

Still a further purpose of the invention is to provide a method for making a frame element cut from a continuously produced composite structure which comprises an interior metallic reinforcement and an exterior coating of synthetic resin which is provided with mounting holes in which the interior metallic edges are protected by the synthetic resin.

Still a further purpose of the invention is to provide a method for making a frame element cut from a continuously produced composite structure as hereinbefore mentioned with mitre cut ends in which the synthetic resin extends beyond the ends of the metallic reinforcement and thereby protects the ends of the metallic reinforcement and simultaneously provides resinous end zones adapted to flow under application of heat and pressure to produce welded frame corners.

Still a further purpose of the invention is to provide a method of continuously producing a composite structure of an interior perforated metallic reinforcement and an exterior coating of synthetic resin which substantially fills the perforations of the metallic reinforcement.

Still a further purpose of the invention is to provide a method of processing a proportion of a continuously produced composite structure as hereinbefore mentioned in the form of frame elements of predetermined lengths with mounting holes the edges of which are formed of synthetic resin only.

Still a further purpose of the invention is to provide at a processing station for continuously forming a perforated metallic strip with a desired profile and applying a coating of synthetic resin to said profile in such a manner that it substantially fills the perforations thereof.

Still a further purpose of the invention is to provide a processing station as hereabove mentioned which includes facilities for cutting the continuously produced composite structure into stock lengths.

Still a further purpose of the invention is to provide at a processing station a method for cutting frame elements of desired lengths from stock lengths of composite structure as hereinbefore mentioned and simultaneously provide mounting holes therein at predetermined points which can be identified later.

Still a further purpose of the invention is to provide a method of making mounting holes in a composite structure as hereinbefore mentioned which comprises the steps of first making the holes oversize, thereafter at least partly sealing the holes and then making the holes in the desired size.

Still a further purpose of the invention is to provide at a processing station for a method for making a frame element cut from a composite structure as hereabove mentioned in which the synthetic resin is caused to flow under application of heat and pressure, so as to be densified and simultaneously flow beyond the ends of the interior metallic reinforcement to provide resinous end zones.

Still a further purpose of the invention is to provide at a processing station an elongated die performing a method in which the synthetic resin of the composite structure is caused to flow into spaces at the ends of the die and in which simultaneously mounting holes which are made oversize are at least partly sealed.

Still a further purpose of the invention is to provide at a first processing station a method in which the holes are made oversize prior to the sealing of the holes in the densifying station hereabove mentioned and in which the mounting holes are produced at predetermined points relatively to selected ones of the perforations of the metallic reinforcement.

Still a further purpose of the invention is to provide a second processing station to be used for making the holes in desired sizes after the sealing of the holes in the densifying station and in which it is possible to locate the same perforations as in the first processing station and thereby make the holes at the same points as in the first processing station.

Still a further purpose of the invention is to provide an assembling station for frame corners of frame elements of composite structure as hereinbefore mentioned with resinous end zones and in which it is possible to control the application of heat, so as to cause the welding of the frame corners to take place only at the resinous end zones without any substantial transmission of heat outside the welding zone.

The invention will be further described in the following with reference to the accompanying drawing in which.

Figure 1:
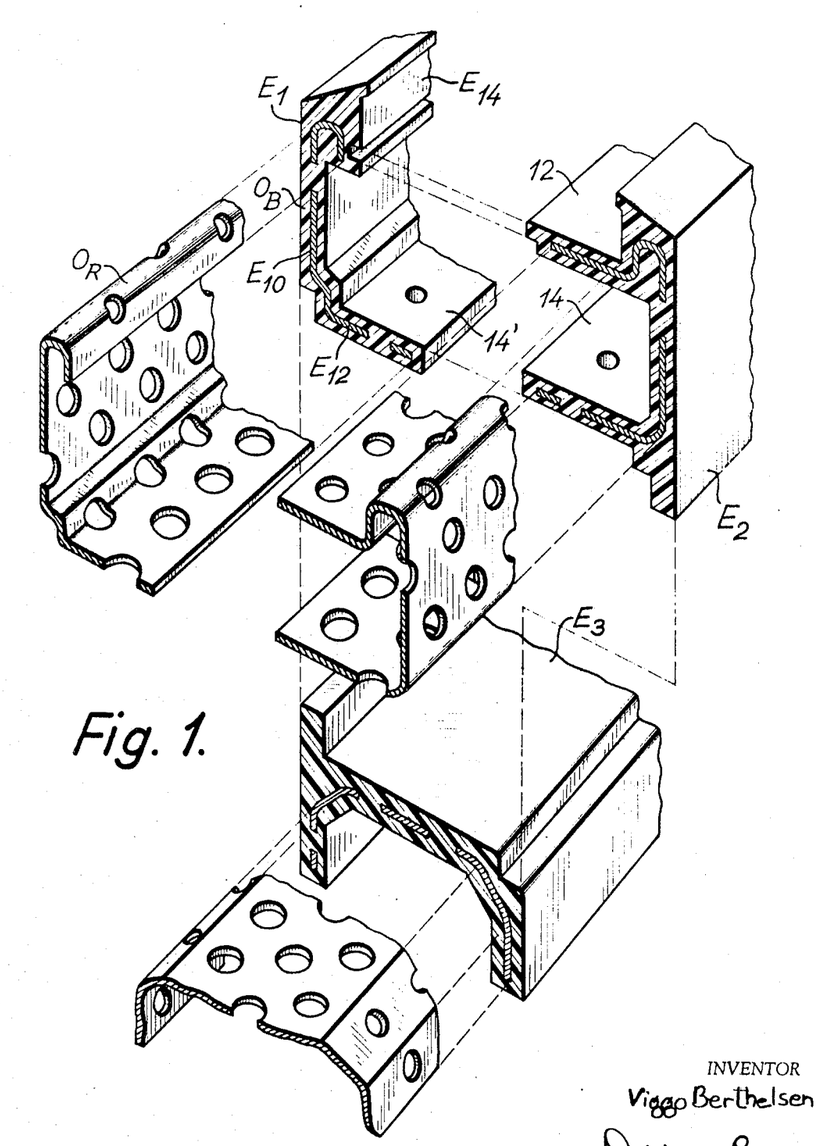
FIGURE 1 is a perspective exploded view illustrating structural elements designed in the manner in which they are supposed to be assembled to form a window structure.

In FIGURE 1 structural elements according to the invention are shown with three different profiles.

Each structure element is in the form of an elongated composite structure having an interior metallic core $O_R$ with a plurality of apertures or perforations and an exterior coating $O_B$ of synthetic resin the layers of which on each side of the interior core member are connected or welded together through the apertures in the metallic core.

The structural elements and their production and assembly to be described in the following examples are primarily concerned with window structures. It will be appreciated, however, that the structural element of the invention which is in the form of an elongated rail having an interior metallic reinforcement and its wider aspect is not limited to the use in window constructions, but can find a wider range of application.

In FIGURE 1 three structural elements $E_1$ $E_2$ and $E_3$ are shown of which the elements $E_1$ and $E_2$ are complementary elements adapted to be assembled as a window frame structure of which the element $E_3$ is designed to form the stationary part.

As will be explained in the following with reference to the element $E_1$—the same explanation also being applicable to any one of the elements $E_2$ and $E_3$—each element is in the form of a profiled body $O_B$ of synthetic resinous material of physical properties to be described in more detail in the following and having intimately embedded therein a metallic reinforcement $O_R$ in the form of an elongated strip which is rolled into an adequate profiled shape and provided with a plurality of holes or apertures of cross sections and with spacing therebetween which is adapted to the physical properties of the synthetic resin in a manner to be more fully described in the following.

In the embodiment of the invention illustrated in FIGURE 1 element $E_1$ has a body portion $E_{10}$ with a flange $E_{12}$ extending at the lower edge thereof, and a relatively shorter and thicker flange $E_{14}$ extending at the top edge thereof.

The resin is molded round an interior metallic reinforcement of a shape and configuration which in the design of the profile provides for a rigid rail-like structure in which the amount of resin per length unit of the rail calculated by weight is not substantially more than the interior reinforcement calculated by weight when using steel. By way of example, if four pounds steel per length unit is used, five pounds resin compound may be used, but of course the ratio between the amount of resin compound and steel may vary according to the market price. With the proportion here mentioned the thickness of the layer of plastic material on each side of a steel reinforcement of about $\frac{1}{32}''$ thickness may be of the magnitude $\frac{1}{16}''$ plastic material on each side of the steel reinforcement.

It will be appreciated, however, that these dimensions may vary within the scope of the invention but they are given here as examples which will enable those skilled in the art to practice the invention and as starting points from which deviations can easily be found by experiments.

The resinous coating is caused to adhere to the metallic reinforcement by providing a plurality of holes or apertures in the metallic reinforcement through which the resin can flow so as to thereby provide a plurality of zones at each of which the plastic layers on opposite sides of the metallic reinforcement are connected or welded together.

The number of holes or apertures, the sizes of the holes or apertures and their distribution must be selected in view of various factors, especially the difference in expansion of the plastic material and the metal as a function of the temperature.

As a preferred plastic material, polyvinyl chloride shall be mentioned. The difference in temperature response of steel and plastic material is of the ratio something like 5:1. At higher temperatures, such as under tropical conditions the difference in expansion of the steel and plastic is not likely to cause any substantial danger of breakage or cracking of the plastic material, because the plastic becomes softer as the temperature increases. With decreasing temperature, however, the plastic material becomes harder and with the plastic material something like five times as much as the steel, tensions will occur in the plastic material.

Therefore the general rule with respect to the sizes, the numbers and the distribution of the holes or apertures is that the plastic material between each of two holes must be able to stand the tensions which occur in the plastic due to the difference in expansion of the plastic and the metallic reinforcemnt within the temperature range under which the structure is to be used.

Figures 2, 3:
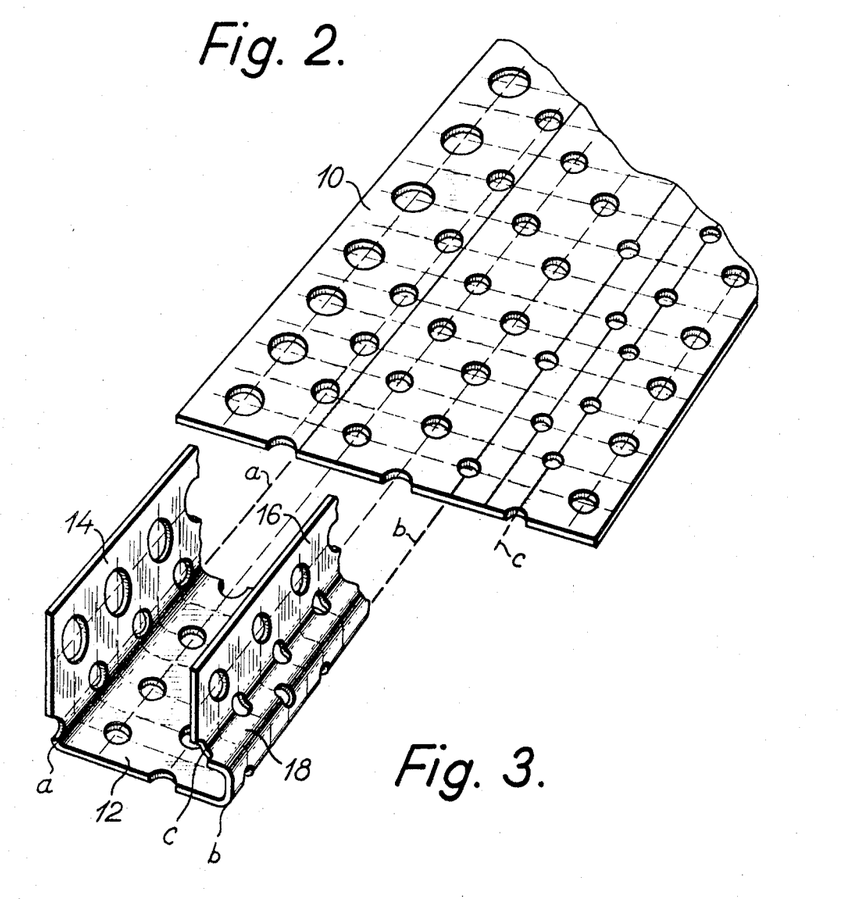
FIGURE 2 is a perspective view of a part of a strip adapted to be used as reinforcement in a structural element according to the invention illustrating the manner in which it is conditioned for such use.
FIGURE 3 is a perspective view illustrating a further stage of processing of the strip shown in FIGURE 2.

As a guide with respect to number and holes, their distribution and the sizes, a pattern as shown in FIGURE 2 can be used for a profile as shown in FIGURE 3 corresponding to the interior reinforcement of the element $E_2$ of FIGURE 1.

The strip 10 of FIGURE 1 is as indicated in FIGURE 3 adapted to be bent about lines $a$, $b$ and $c$ to provide a rail structure of FIGURE 3 with a body portion 12, a first flange 14, a second flange 16 and curved or bent-over portion 18.

The pattern of holes is such that in the flange 14 there are two lines of relatively large holes mutually displaced. The same counts for the body portion 14 and in the second flange 16 a single line of such relatively larger holes is provided displaced relatively to the holes of the body portion. In the curved portion there are provided two lines of relatively smaller holes with double the space between the holes than in the body portion and with the holes mutually displaced. A similar line of holes is provided in the bending line $c$ between the flange 16 and the bent-over portion 18, also with double space between these holes.

While the holes in the body portion and flanges may be something like $\frac{3}{8}''$ with a distance between the holes of 2–3 times the diameter of the holes, the holes in the curved portion 18 should be slightly smaller, for example $\frac{1}{4}''$.

The strip 10 may be a .40" steel strip which should be cold rolled to obtain a hardness compatible with roll forming to a radius of $\frac{3}{32}''$ without the danger of cracking of the metal which may cause subsequent cracking of the plastic coating. Obviously the pattern of holes with smaller holes and larger spacing between the holes at the zones where the strip is to be rolled to a smaller radius also serves the purpose of retaining the necessary physical properties of the strip along zones where it is to be rolled with a relatively small radius.

While in the foregoing and in FIGURE 2 round holes have been shown, it will be obvious that also holes of odd configuration, for example square configuration, can be used.

Figure 4:
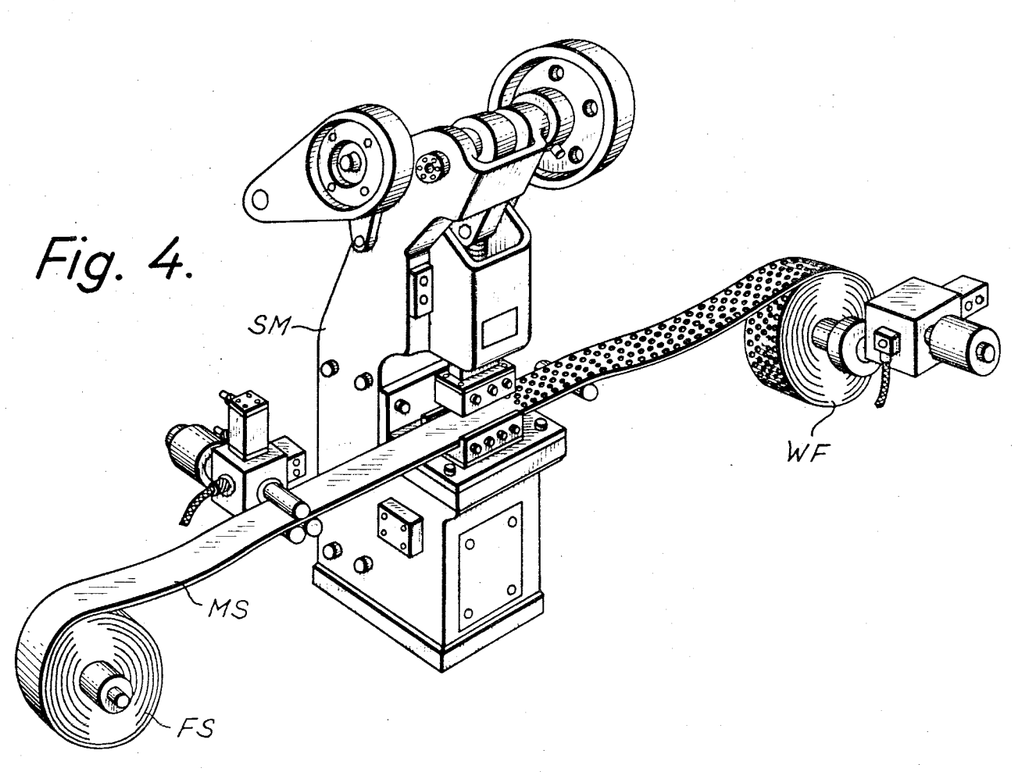
FIGURE 4 is a perspective view of a station of the flow line for producing the strip of FIGURE 2.

The holes are preferably, as shown in FIGURE 4, produced in the desired pattern by passing the strip MS from a supply FS through a punching press SM with automatic feeding. The perforated strip is magazined in a take-up coil. The burrs should be removed automatically, for example by passing the strip through between rollers after the punching, or by passing the strip through a sand-blowing zone following the stamping press. The passage of the strip through the sand-blowing zone also has the advantage that any rust or other surface impurities will automatically be removed so that the strip is clean and in addition provided with a slightly uneven surface to which the plastic material can adhere.

Figure 5:
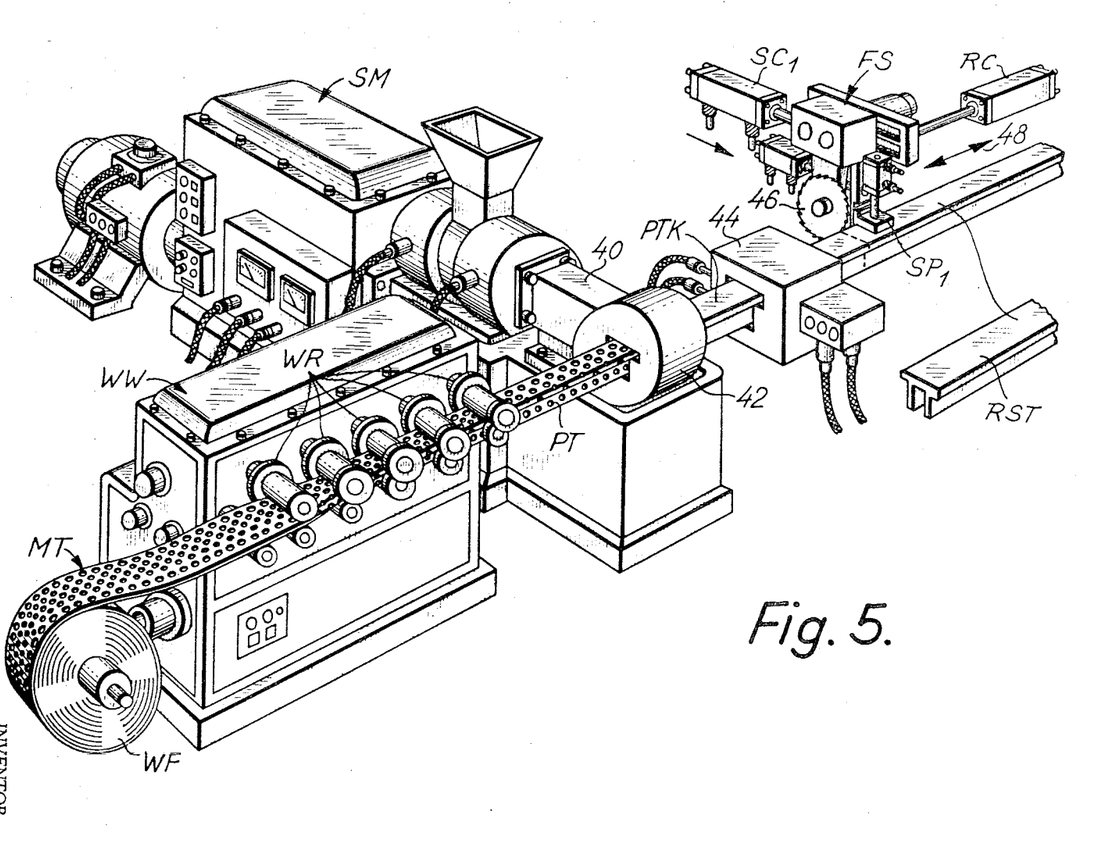
FIGURE 5 is a combined flow line station illustrating the shaping of the strip of FIGURE 2 into the form of a profile, applying plastic coating to this profile and eventually cutting the thus produced composite structure into stock lengths.

The next production station is a rolling mill as shown in FIGURE 5, having a plurality of rollers WR depending on the desired profile of the strip. The profile rolling mill may have between eight and fourteen stages.

The rolling mill into which the strip is fed from a coil supply MT is indicated by WW in FIGURE 5. With the flat strip coming in, the strip PT comes out with the desired profile which in FIGURE 4 corresponds to that of the element $E_2$ of FIGURE 1.

From the rolling mill the strip is continuously forwarded to an extruder SM from which plastic material through a duct 40 is supplied to an extrusion head 42 from which the profiled strip is forwarded at a predetermined speed and in which the strip is coated with a predetermined thickness of plastic.

Hereby a composite structure is provided comprising the profiled strip with coating of plastic material on both sides and multiple sealing of the plastic coating through all the holes or apertures of the metal strip material.

Following the extruder, the composite strip structure may conveniently be passed through a cooling or tempering station 44 having suitable forming means, such as cold rollers or polished surfaces, by means of which the plastic material simultaneously with being cooled down is subjected to a slightly further profile shaping so as to condition the composite structure for further processing and to enable the conditioning of the length of composite structure for being assembled into the form of frames to be carried out in one operation.

With the rail structure being fed continuously through the rolling mill and with the composite structure coming out of the extruder in continuous lengths, the next step is to cut the composite structure into desired lengths. To this purpose a cutting saw 46 is provided in the form of a flying saw structure FS which follows the cooling station 44. Obviously, the saw 46 is mounted for reciprocation in the direction against the composite rail structure to cut it into lengths and simultaneously for reciprocation in the direction of the arrow 48 through a stroke which is determined by the lengths into which the composite rail structure is desired to be cut.

In the flying saw structure FS of FIGURE 5 a clamping device $SP_1$ is used adapted to be activated by means of a pneumatic or hydraulic cylinder. A further cylinder $SC_1$ is shown for reciprocating the saw and a cylinder RC is shown for moving the flying saw device back after the stock length RST has been cut off the continuously produced composite structure.

At this stage a twin-saw structure may, if desired, be used, which is designed for mitre cutting.

In most cases, however, the mitre cutting station will have to be controlled in accordance with the sizes of frames to be produced, and in most cases it may therefore be recommended to cut the composite structure rail into stock lengths at the final stage of FIGURE 5 and leave the further processing to be carried out at subsequent stations.

Figure 6:
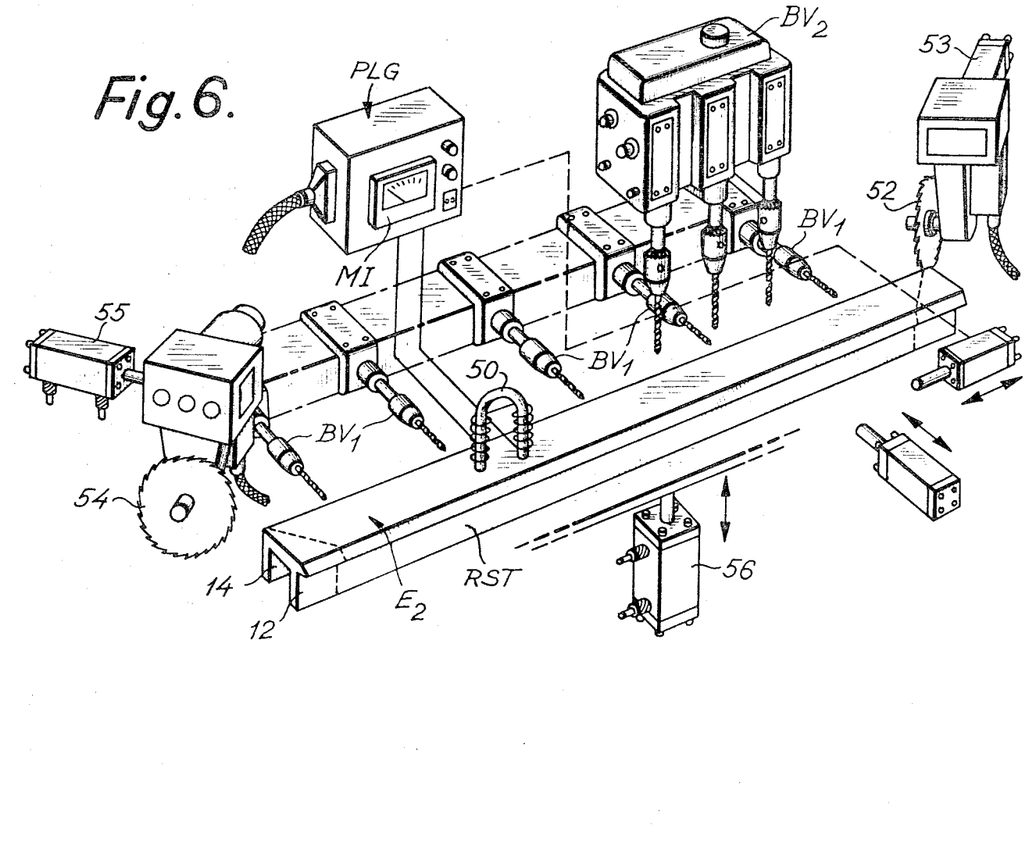
FIGURE 6 is a perspective schematic view of a processing station for a length of composite structure as produced in the station of FIGURE 5.

Supposing this to be the case, FIGURE 6 schematically illustrates a combined mitre cutting and hole drilling station.

A window frame assembled in the last stage of the two elements $E_1$ and $E_2$ of FIGURE 1 is supposed to be assembled by means of countersunk screws through holes indicated by M in FIGURE 1.

Obviously, these holes must be spaced through the entire rail structure RST and may for example be provided for something like each six inches. Furthermore, these holes should be provided in such a manner as to utilize the holes already existing in the metallic part of the composite structure. To this purpose the station of FIGURE 1 includes in addition to a multispindle drilling machine having a plurality of chucks $BV_1$ spaced apart corresponding to the desired distance between the holes, an electronic holesfinder device 50 which basically is in the form of a magnetic core structure having two legs spaced a distance corresponding to the distance between two holes of the metallic part of the composite structure, a pair of magnetic cores and a control arrangement PLG including indicator or other suitable means operable to signal correct position of the composite structure RST relatively to the holesfinder or deviation of the position of the structure relatively to the holesfinder, preferably in such a manner that control means for moving the composite structure longitudinally at the station of FIGURE 6 is activated until the desired position of the composite structure has been found whereafter the control means is rendered ineffective and a clamping device 56 becomes effective. The desired number of holes is hereafter drilled and at the same time a pair of mitre cutting saws 52 and 54 controlled by means of cylinders 53 and 55 cut the composite structure in mitre in the desired lengths adapted to be used in the frame structure.

Since a window has to be provided with hinges or similar means for pivotally supporting the window in a frame, the station of FIGURE 6 also has a drilling station $BV_2$ for such holes as will be necessary for hinges or similar supporting means.

At this station the mitre cut length may simply be moved against a stop relatively to which the drills are correctly located, and the drilling of the hinge holes or the like are performed right through the composite structure. These holes are, however, in the station of FIGURE 6, drilled oversize so as to enable the metallic edges exposed during the drilling to be protected in the final stage of the processing so as to thereby prevent deterioration of the interior reinforcement to take place starting from such holes.

Figure 7:
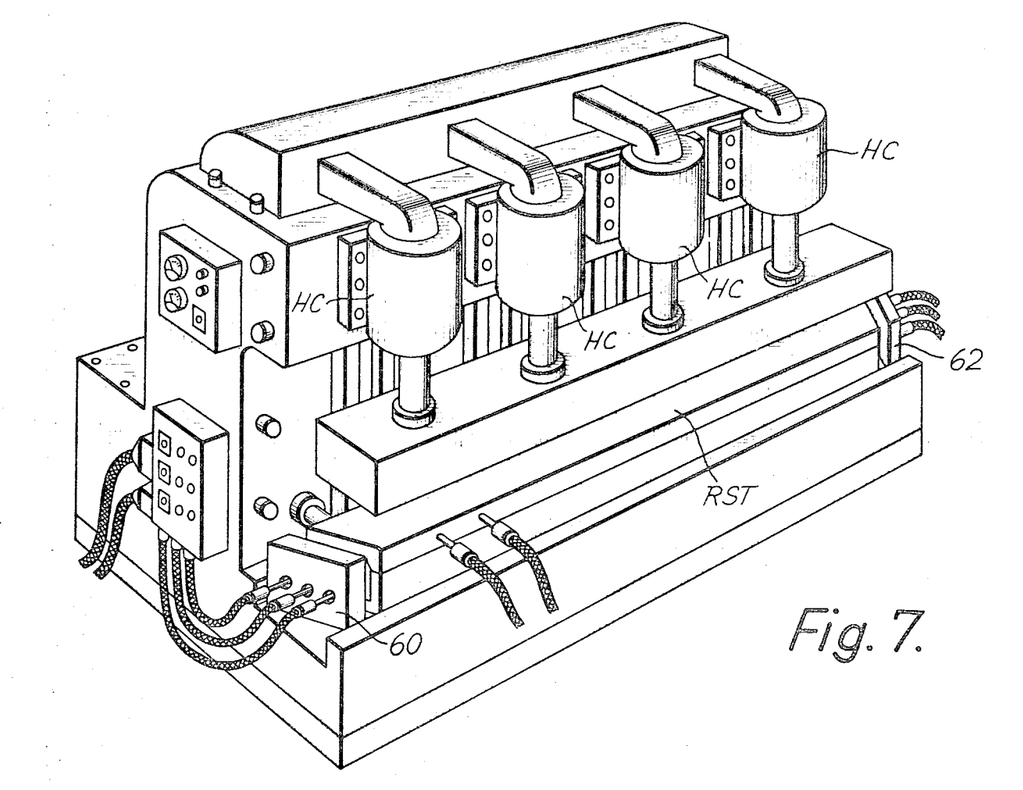
FIGURE 7 is a perspective view of a further processing station adapted to provide a finish to the composite structural elements and simultaneously condition them for assembly into the form of frames.

The next stage of conditioning the mitre cut and predrilled lengths of composite structure for being assembled into the form of frames includes a hot pressing operation in a press as indicated in FIGURE 7 and using a specially constructed tool which performs a double function, namely giving the desired final finish to the exterior surface of the composite structure and embedding all exposed metallic edges into the plastic material while simultaneously conditioning the mitre cut ends for being assembled into frame structures.

To this purpose the press is adapted to press the composite structure under substantial pressure such as 12–1400 p.s.i. and at a temperature which is sufficient to keep the plastic material flowing under this pressure, for example 160–180° C.

The processing at the pressing station FIGURE 7 therefore has the character between a pressing and a moulding. The tool is in the form of a specially constructed elongated die structure having mitred ends 60 and 62 spaced so much from the mitre cut ends of the composite structure that when the plastic material flows, it will flow beyond the ends of the interior metallic part of the composite structure whereby the metallic edges which were exposed during the mitre cutting now will be embedded in the plastic material and simultaneously the composite structure will be provided with mitred end zones of plastic material only.

Figure 8:
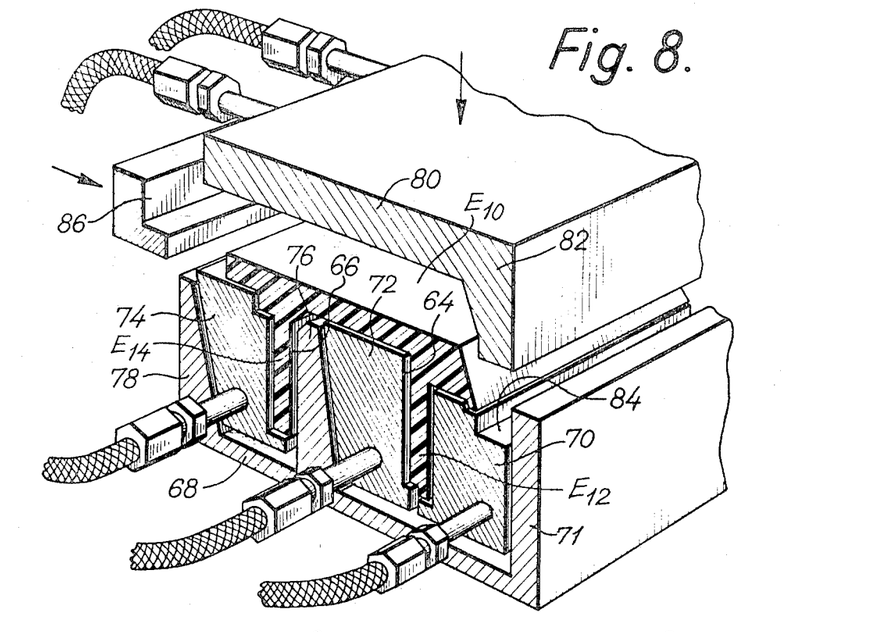
FIGURE 8 is a perspective schematic view of a detail of the station of FIGURE 7.

Between the mitred ends 60 and 62 the tool is provided as shown in FIGURE 8 with elongated channels adapted to receive the flanges $E_{14}$ and $E_{16}$ in the case of an element of the type $E_2$ of FIGURE 1.

In FIGURE 8 the right hand side wall of the channel 66 is a wall of a rib-like element 76 associated with the rigid structure 68. The right hand side wall of the channel 64 is a wall of a member 70 which is guided for vertical movement relatively to the rigid bottom structure, for example against resilient action. The left hand side walls of the two channels 64 and 66 are each constituted by a substantially vertical surface of each of two wedge shaped members 72 and 74 which are mounted for vertical movement and guided on inclined surfaces of stationary ribs 76 and 78 which form a part of the bottom structure 68 and of which the rib 76 forms the right hand side wall of the channel 66.

The top part of the press tool has a substantially plane top portion 80 and a vertically depending portion 82. When the top part of the press tool is moved down, the flat portion 80 initially presses on the body portion of the composite structure whereby the vertically movable portions or inserts of the underpart of the press tool will be moved down and the portions 72 and 74 will be edged against the flanges of the composite structure. When the top portion of the tool has reached the desired position, its depending portion 82 abuts against a shoulder 84 of the bottom portion, while simultaneously pressing the portion 70 against the bottom structure 68.

In addition, the press tool is provided with a side pressure member 86.

The channels of the tool are so adapted to the amount of plastic material applied to the composite structure in the station of FIGURE 4, that the entire structure is subjected to a molding action which not only causes the plastic material to flow out at the ends, but also causes the holes which previously have been drilled to be at least partly closed.

If desired, the cavity of the tool may be constructed with a slightly larger volume than the entire amount of plastic material of the composite structure itself so as to enable an elongated sheet or strip of plastic material to be applied to the visible surfaces of the composite structure by utilizing the flow action of the material in the tool of FIGURE 8.

This has the advantage that the composite structure can be produced by means of a plastic material composition which is suitable for extrusion and convenient in making the composite structure without any attention being paid to the desired color of the final frame structure at that part of the process and the color scheme can then be settled at the pressing stage.

When the composite structure comes out of the tool of FIGURE 8, it is in the final shape with the material slightly densified and if desired with a surface coating of desired color. At both ends the structure is now provided with mitred zones of plastic material only. In addition, all the holes drilled at the station of FIGURE 6 are at least partly closed, because the plastic material has been flowing into the holes previously drilled and has sealed the exposed edges of the interior metallic part of the composite structure.

Figure 9:
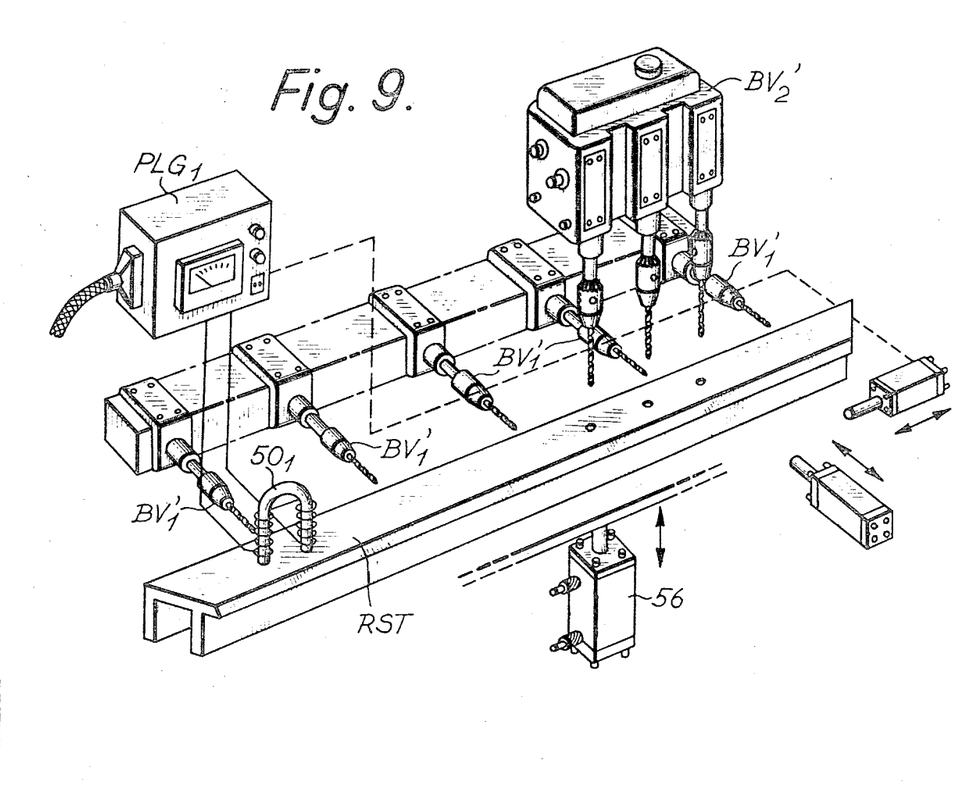
FIGURE 9 is a further processing station.

Before assembling the composite structures into frames it is therefore desired to redrill the holes, which is carried out in a station as indicated in FIGURE 9 by means of a multi-spindle drilling machine for drilling the holes drilled in the station of FIGURE 6 and in that of the profiles in which the holes will have to be countersunk, preferably automatic countersinking can also be carried out in the station of FIGURE 9.

Like in the station of FIGURE 6 an electronic hole finder $50_1$ with a control device PLG is again provided so as to locate the composite structure RST correctly relatively to those drills $BV_1$ and $BV_2$ of the station which are drilling the holes for the assembly screws. All the holes are now drilled in the correct size. As will be remembered, the hinge holes in the station of FIGURE 6 were drilled in oversize. By drilling the holes in the correct size now and on the same spots as in the station of FIGURE 6, it is secured that there will be no metallic edges exposed in any of the holes.

In the case of countersinking the assembly holes in the station of FIGURE 9, a second series of countersinking drills is provided and automatic sequencing control is provided for transporting the composite structure from the hole drilling position to the countersinking position including automatic clamping, etc.

Figure 10:
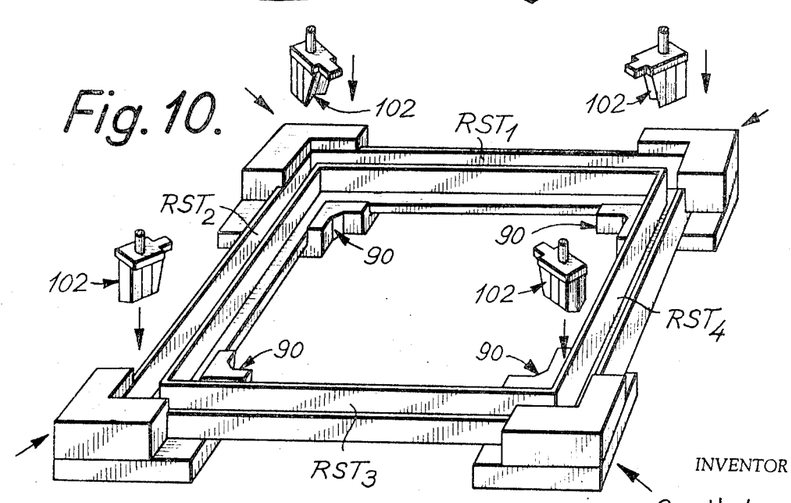
FIGURE 10 is a schematic perspective view of a processing station for assembling a frame structure from composite structural elements.

After the drilling of the holes in the station of FIGURE 9 the composite structure lengths are ready for being assembled into the form of frames in a frame assembly station as schematically illustrated in FIGURE 10.

Figure 11:
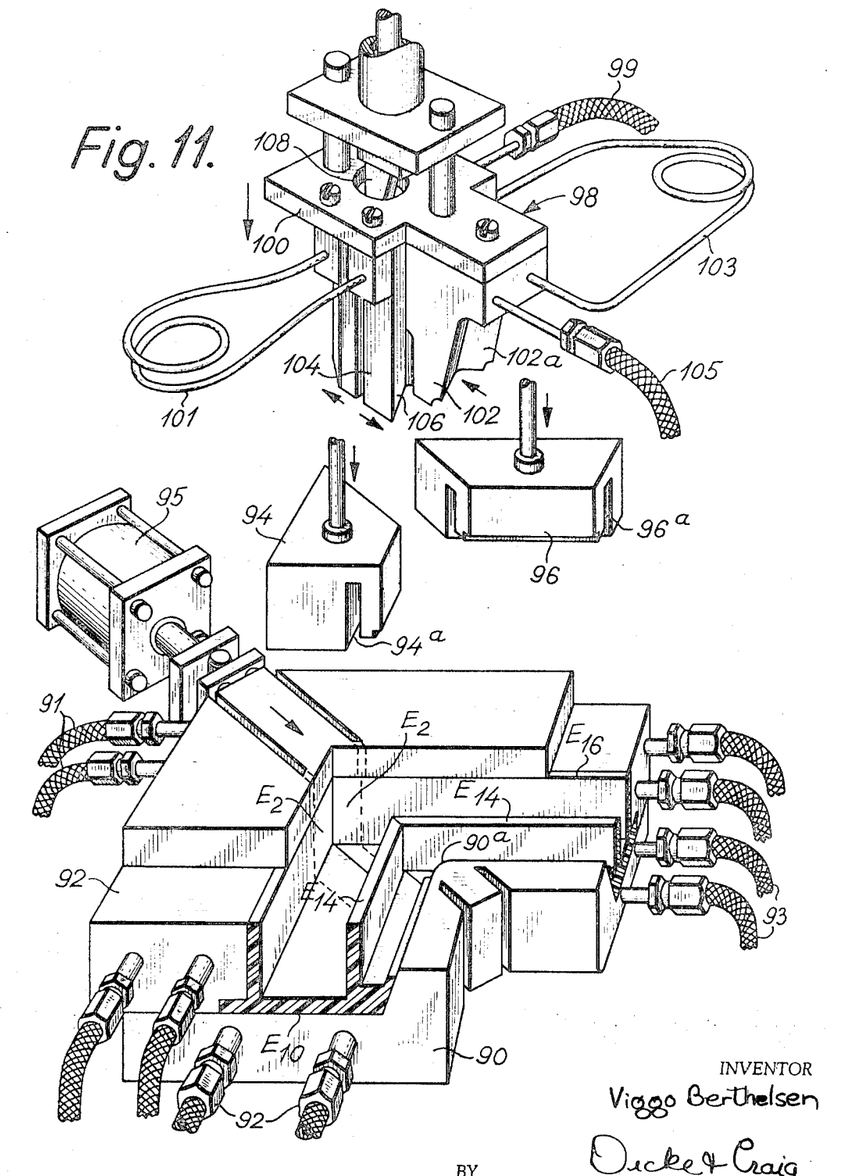
FIGURE 11 is a perspective schematic view of details of a part of the station of FIGURE 10.

The assembly station of FIGURE 10 comprises four corner presses each as schematically indicated in FIGURE 11 with underparts 90 adapted to receive the four lengths $RST_1$, $RST_2$, $RST_3$ and $RST_4$ and upper parts 102 adapted to weld the corners.

The corner press of FIGURE 11 includes a bottom portion 90 adapted to receive the ends of two adjoining composite rail structures with the mitred plastic covered ends into engagement. The rigid bottom portion 90 is preferably provided for cooling such as by means of ducts 92 operable as inlet and outlet for cooling medium such as cold water or other suitable cooling medium.

In order to press the mitre cut ends together, an L-shaped side pressure member 92 with control cylinder 95 is provided adapted to be pressed into firm engagement with the composite rail structures in the direction from the corner.

Above the underpart 90 a first pair of upper parts 94 and 96 are provided, movable downward and each having a groove 94a and 96a adapted to receive the flange of the composite structure. The members 94 and 96 have their opposite edges cut in mitre corresponding to the mitre cutting of the composite rail structures and with the mitre cut surfaces spaced substantially the same distance as the distance between the metallic edges of the two composite rail structures so as to leave resinous end zones EZ of the composite structures exposed between the members 94 and 96 when they are moved down into engagement with the composite structures and thereby condition the structure for corner assembly.

The corner assembly is provided by means of an especially constructed to part 98 of the corner assembly tool which is adapted to weld the corner under application of heat and pressure.

If desired, also the members 94 and 96 may have hollow ducts for passage of cooling medium so as to insure that during the corner pressing and assembly the heat which causes the plastic material to flow is concentrated to the areas where plastic material only is present and is not transmitted into the other parts of the composite rail structures. The top part 98 of the corner assembly of FIGURE 11 has a body portion 100 with two parts 102 and 104 depending therefrom and slightly movable relatively to each other. Between the two parts 102 and 104 an angular space 106 is provided adapted to receive the ends of the flanges 14 of the composite structure. The lower end of the portion 102 is slightly wedge-shaped at 102a and adapted to cooperate with a correspondingly sloping portion at the corner member of the underpart 90.

The member 104 is in the form of a duplex structure composed of two parts which are movable relatively to each other and adapted to be expanded actuated by an elongated wedge member 108 which is actuated in downward direction as the pressure increases.

The members 102 and 104 include means 99, 101, 102 and 105 for applying heating and cooling medium to be circulated therethrough, for example as indicated from one of the members to the other through exterior pipe connections of suitable flexible design to provide for the mutual movement between the portions.

In operation the arrangement of FIGURE 11 works in the following manner:

With the mitred composite structures mounted in position on the underpart 90, the timing scheme is such that in the first instance the side pressure member is brought into engagement with the composite structures and presses them firmly into engagement with the interior angular abutment of the underpart 90.

Thereafter the two top portions 94 and 96 are moved down into engagement with the composite structures to leave at the corner only that zone exposed at which the assembly is going to be effectuated, namely the mitred end zones beyond the end edges of the interior reinforcement.

With cooling medium such as cold water passing through the underpart 90 through pipes 92 and 93 and if desired also through the side pressure member 92 through pipes 91 and the top part members 94 and 96, it is effectively prevented that the temperature of the plastic material outside the exposed zone of the corner structure can be increased to such an extent that the plastic material can flow in response to application of heat at the corner except at the exposed corner zones EZ.

When thereafter the corner zone pressure structure 98 to which heating medium is applied is moved down, the corner flange portions $E_{14}$ will be received between the members 102 and 104. The member 102 in its active position operates as corner abutment between the flange portion 14 and the angular portion of the underpart 90 and causes at the same time application of heat and pressure to the exposed corner zones EX of the body portions of the composite structure between the flange end 14 and the corner of the underpart 90 whereby the body portion of the material here will be caused to flow and be slightly compressed and densified sufficiently to effectively provide a welding action.

When hereafter the main pressure is applied to the hot portion 104 of the duplex structure and the wedge 108 is activated, the corner zone welding will be effectuated between the flanges 14 and 16 and at the same time pressure and heat sufficient to provide the welding and densify the material will be applied at the bottom between the flanges 14 and 16.

Depending on the heat and pressure applied which should be of a similar magnitude as in the press of FIGURE 7, a slight reduction of the thickness of the exposed corner portions may take place.

Though in most cases the corner will be provided in the manner here described and by the means schematically illustrated in FIGURE 11 will be sufficiently strong, especially considering that a window is going to be assembled from two complementary composite structures, it may be convenient at the stage of the corner welding to provide for supplementary interior reinforcement of the corner zones and/or application of further plastic compounds.

Figure 12:
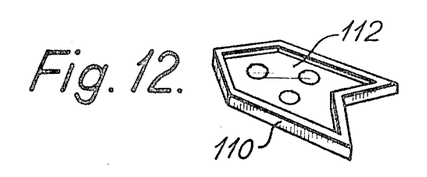
FIGURE 12 is a perspective view of a detail of an ancillary structure for use in the processing at a station of FIGURES 10 or 11.

To this purpose suitable means such as an auxiliary structure as indicated schematically in FIGURE 12 and comprising a thin plastic compound member 110 of a configuration corresponding to the exposed corner zones with a cavity in which a thin metallic member 112 having suitable perforations is placed on the exposed corner zones with the metallic member 112 facing downwardly. The amount of plastic material should, of course, not be more than to compensate for the compression and densification of the corner structures when applying the pressure.

Alternatively, the corner structure may be designed for injection moulding of a small amount of plastic compound. Also in such event, depending on the strength of the corner welding desired, a metallic reinforcement member may be placed on the exposed corner zone. Such metallic reinforcement member may also simply be in the form of a piece of wire shaped into the form of a spiral or into wave-form. In order to secure proper embedding of such reinforcement wire it can be in the form of a wire covered with the same plastic compound used for the composite structure or with a plastic compound compatible therewith.

Obviously, it will also be possible instead of a structure as indicated in FIGURE 12 simply to use a suitably shaped piece of wire covered with a sufficiently thick layer of plastic compound to have thereby available the necessary supplementary amount of plastic compound which, depending on the circumstances, it is convenient to supply as supplementary material at the corners.

Alternatively, it will also be possible within the invention to construct the underpart 90 of the welding station of two portions which are slightly movable relatively to each other, for example between $\frac{1}{32}''$ and $\frac{1}{16}''$, so that when during the welding operation the synthetic resin flows the side pressure applied will cause the two portions of the underpart to be moved together whereby it will be possible to perform the welding without the necessity of having supplementary plastic or any reinforcement.

The profiles of the composite structures may vary widely within the scope of the invention depending on the types and sizes of windows to be produced by means of the frame structures.

Figure 13:
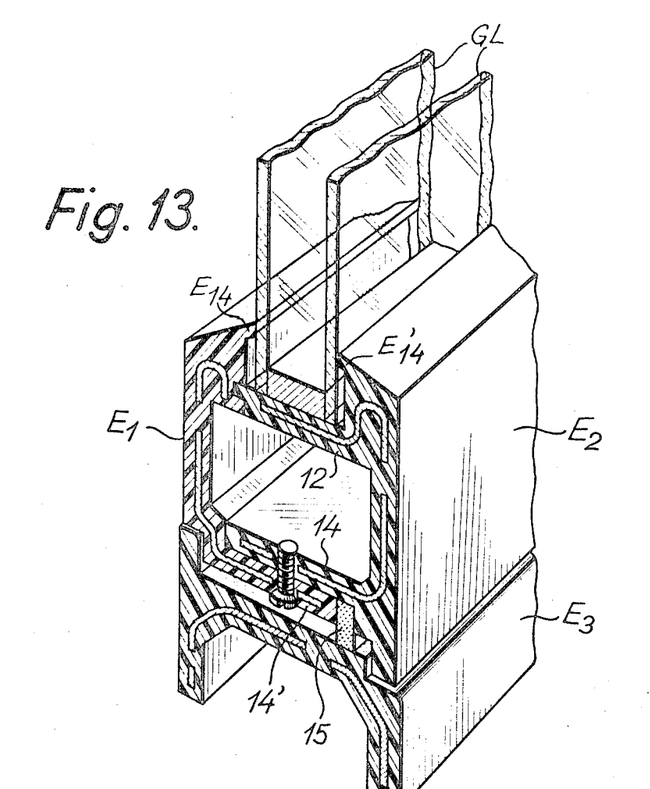
FIGURE 13 is a general perspective view in section illustrating a window structure using assembled elements of composite structures according to the invention.

Basically in the production of windows two different profiles are necessary as indicated in FIGURE 1 and FIGURE 13, having complementary portions, namely flanges 14 and 14' for providing the assembly and the other flange 12 for engaging the complementary part to provide a rigid structure of tubular cross section.

In the final shaping of the composite structures, various ribs and grooves may be provided as indicated in FIGURE 13 adapted to interlock the parts when assembled.

FIGURE 13 also indicates the manner in which a double glazing may be supported between the complementary parts, if desired spaced from both parts and from the top of the flange 12 by suitable material not shown.

FIGURE 13 also illustrates the stationary frame in which the window is to be mounted together with the recesses and abutments provided on the various profiles in order to provide a tight window. As indicated a gap may be provided at the end of the flange 14' to provide for an elastic beading, such as for example of foam material 15 to be inserted therein to secure improved tight closing of the window.

As will be appreciated, the frame structures according to the invention can be produced with narrow tolerances so as to enable window frames and frames for other purposes to be produced with much more narrow tolerances than it is possible in the wood working industry.

The production technique of making elongated composite structures with the special corner assembling technique and use of complementary profiles for assembling frames provides for a saving and results in a better frame than structures made of welded tubular members which are supposed to be covered with suitably profiled plastic material because an intimate connection of metal and plastic as according to this invention cannot be obtained by any previously suggested technique.

It will also be appreciated that the method of producing frames as described hereinbefore does not include any processing stage which cannot be performed by means of modern rational mass production technique, such as automation.

Obviously, the stamping press of FIGURE 1 including the feed-in of the strip and coiling-up of the perforated strip can be fully automated by using suitable sequence control technique.

The combined station of FIGURE 4 which comprises the rolling mill, the extruder, the cooling or tempering zone and the flying saw 46 can also be fully automated using suitable sequence control. A plurality of controls are already included in the extruder 40 and are usually available as electrical command switches in the form of pushbuttons to be actuated by the operator following his reading of various instruments and finding that the working conditions are satisfatory. These instrument readings can of course be taken out as sensing signals and included in a sequence control programme with suitable sensing means feeling on the composite rail structure to provide for a command signal back to the rolling mill to reduce the speed if for some reason the thickness of the plastic layer should be reduced, or alternatively to increase the speed if too much plastic material is applied.

The inclusion of the flying saw in such sequence control programme can be provided by means of a feeler located at the end of the desired length of the composite structure which releases a command signal for clamping the flying saw structure on the composite rail structure, thereafter performing the cutting, retracting the cutter, releasing the clamping and eventually retracting the saw to its neutral position for repeating this part of the cycle.

It may be aforeseen that the cutting member, which may be a cutting disc rather than a cutting saw, will be worn so much that it requires replacement more frequently than it is convenient to close down the combined extruder station.

With the cycle briefly described here, and supposing an extrusion speed of 2–3 feet per minute with for example stock lengths cut off being of 6 foot, this means that the flying saw will only operate once every two or three minutes during the complete cycle of this station. There is therefore ample time in this station to provide for feeling of the state of the cutting member at the start of each of its cutting cycles and a subsidiary programme with change of cutting member carried out in the interval. If necessary it is also possible to combine the change of cutting member with a signal back to the rolling mill and extruder with command to temporarily reduce the speed of the rolling mill as well as decrease the flow of plastic correspondingly with reassuming the normal speed after the automatic change of cutting member has been completed.

Also the drilling stations of FIGURES 5 and 8 can be automated easily with supply of the stock lengths from a magazine, forwarding until the holefinder 50 indicates the correct position, thereafter clamping, drilling, if desired forwarding to a second drilling position, and automatic throw-out with feeling of the completed cycle.

In the drilling station of FIGURE 9, two drilling positions are necessary in the automatic cycle because the holes for the screws first have to be redrilled whereafter countersinking must take place.

In the corner assembly station the commands can be given simultaneously to the presses at all four corners. Most of the movements are simple movements, the completion of which can be determined by means of sensing devices having the character of end switches so as to understand that for example the increase of pressure exerted by the side pressure member 92 and the top members 94 and 96 can be terminated when the desired pressure has been built up. The sensing of the operation of the member 98 may, however, require a timing element included in the sensing device, inasfar as it will probably be more easy for a predetermined pressure to determine the curing time necessary to complete the welding than it will be to construct a sensing device which signals the completion of the welding.

The same counts for the sequence control necessary in connection with the press of FIGURE 7.

From the foregoing it will appear, however, that the composite structure of the invention including its production, its division in lengths and further processing into frame structures is a relatively simple flow-line production scheme which lends itself to automation by means of sequence control at the various stages and therefore without the necessity of complete automation using complex integration can be carried out with a relatively minimum of labor.

As apparent from the brief indication of how sequence control can be provided at the individual stations, it will be obvious that all the stations are so much alike that the same sequence control system can be applied with advantage at its station, whereby the entire plurality of individually sequence control stations can be interlinked by means of a master sequence control of the same type as applied at the individual stages and thereby at substantially less capital expenditures than required for integrating the flow of crude material and material processed at a plurality of stages through a plant.

Though in the foregoing the composite structure according to the invention, its production and further processing into the form of frame structures have been described especially with respect to production of ready-made windows, it will be obvious to those skilled in the art that the teaching and technique of this invention can be applied to the production of frame structures for other use in the building industry. Obviously, the invention is neither limited to the production of frame structures of square configuration but enables with different mitre angles and with use of different profiles and thickness of steel used the production of different structural elements or combinations of structural elements which can find a plurality of different applications in the building industry.

Obviously, instead of a profiled strip of steel shaped by rolling, a profiled strip of a suitable other material such as an aluminium alloy may be used for lighter frame structures, or in the case of more heavy frame structures a more heavy steel profile may be provided with holes or apertures in the desired number and distances by passing it through different stamping presses or combinations of stamping presses and drilling stations, and thereafter providing the plastic coating on the two sides to be intimately connected with the interior structure through the holes or apertures thereof.

It will also be obvious that further modifications of the production technique and the sequence of carrying out the various processing steps can be varied within the scope of the invention, depending on the sizes of structural elements and the ratio between interior reinforcement and plastic material used therein, depending on the desired application of the structural elements.

It will also be obvious to those skilled in the art of plastic materials that though for example polyvinyl chloride is a suitable plastic compound for the procedure described hereinbefore, not only the composition of the compound may be varied depending on the conditions under which the frame structure has to be used, for example under tropical conditions or under polar conditions, but it will also be understood that other plastic compounds may be used within the scope of the invention and that the selection of such plastic compounds easily can be made by those skilled in the art.

I claim:
1. The method of producing a composite structure comprising a metallic reinforcement with an exterior coating of synthetic resin comprising the steps of punching perforations of selective sizes and varying spacing in respective portions of a continuous length of a metallic sheet strip, rolling said strip into the form of a desired profile with the curved portions of the profile containing more widely spaced perforations than the flat portions thereof, and extruding synthetic resin to effectively cover opposite surfaces of said metallic profile with opposite layers which are connected through the perforations of said metallic strip.

2. The method of producing a composite structure comprising a metallic reinforcement with an exterior coating of synthetic resin comprising the steps of punching perforations of selective sizes and varying spacing in respective portions of a continuous length of a metallic sheet strip, rolling said strip into the form of a desired profile with the curved portions of the profile containing more widely spaced perforations than the flat portions thereof, extruding synthetic resin to effectively cover opposite surfaces of said metallic profile with opposite layers which are connected through the perforations of said metallic strip, and eventually calibrating and tempering the composite structure.

3. The method of producing a structural frame element comprising a metallic reinforcing with an exterior coating of synthetic resin, comprising the steps of punching perforations in a continuous length of a metallic sheet strip, rolling said strip into the form of a predetermined profile, extruding synthetic resin around said metallic profile to provide a composite structure of said profiled strip and said synthetic resin with opposite layers of said synthetic resin connected through the perforations of said metallic strip, cutting a length of said composite structure corresponding to the desired length of said frame element and subsequently subjecting said length to heat and pressure to densify the synthetic resin and simultaneously cause the synthetic resin to flow beyond the ends of the metallic strip to provide resinous end zones.

4. The method of producing a profiled structural frame element of a predetermined length with mitred ends comprising an interior metallic reinforcement and an exterior coating of synthetic resin comprising the steps of perforating a continuous length of a metallic sheet strip, processing said strip with a predetermined profile, providing a continuous length of a composite structure of said strip and said synthetic resin by extruding synthetic resin to effectively cover said metallic strip and substantially fill the perforations of said metallic strip, cutting a length of said composite structure which is slightly shorter than said length of said frame element with mitre cut ends and subsequently processing said frame length to cause the synthetic resin to flow beyond said mitre cut ends to provide said predetermined frame length.

5. The method of conditioning a structural element in the form of a portion which is cut from a continuous length of a composite structure having an exterior resinous coating and an interior metallic reinforcement for being assembled in a frame structure comprising the steps of cutting the portion of said composite structure slightly shorter than the length of the structural element when assembled in the frame structure and subjecting the cut portion to heat and pressure to cause the resinous material to flow over the edges of the interior metallic reinforcement to provide the length of the structural element to correspond substantially to the length of the structural element in the frame structure.

6. The method of producing a frame structure from portions of predetermined lengths cut from a composite structure of a metallic reinforcement having an exterior resinous coating, comprising the steps of subjecting the portions to heat and pressure to cause the resinous coating to flow beyond the ends of the metallic reinforcement to provide end zones of resinous material, supporting four portions of said composite structure with said resinous end zones into engagement, and welding said portions together by heating said resinous end zones only and cooling the adjacent portions of said composite structure portions.

References Cited
UNITED STATES PATENTS

| | | | |
|---|---|---|---|
| 846,482 | 3/1907 | Layne | 29—163.5 |
| 2,051,639 | 8/1936 | Kalmbacker | 29—163.5 X |
| 3,094,197 | 6/1963 | Attwood | 29—155 X |
| 3,167,856 | 2/1965 | Zoller | 29—529 |

THOMAS H. EAGER, Primary Examiner

U.S. Cl. X.R.

29—163.5, 411, 417, 458, 476, 529; 52—309